United States Patent [19]

Olsen et al.

[11] Patent Number: 4,940,549
[45] Date of Patent: Jul. 10, 1990

[54] METHOD FOR REMOVING TOXIC METALS FROM AGRICULTURAL DRAIN WATER

[75] Inventors: Orrie C. Olsen; Peter F. Santina, both of Walnut Creek, Calif.

[73] Assignee: Santina Water Company, Concord, Calif.

[21] Appl. No.: 304,497

[22] Filed: Jan. 31, 1989

[51] Int. Cl.$^5$ .............................. C02F 1/48; C02F 1/70
[52] U.S. Cl. ..................................... 210/695; 210/719; 210/721; 210/724; 210/726; 210/737; 210/912; 423/55; 423/508
[58] Field of Search ................ 210/695, 716, 717, 719, 210/721, 722, 724, 737, 902, 912, 726; 423/55, 58, 508, 509

[56] References Cited

U.S. PATENT DOCUMENTS

| | | |
|---|---|---|
| 3,933,635 | 1/1976 | Marchant ............................ 210/719 |
| 4,026,797 | 5/1977 | Nikolic et al. ...................... 210/719 |
| 4,405,464 | 9/1983 | Baldwin et al. ..................... 210/719 |
| 4,422,943 | 12/1983 | Fender et al. ....................... 210/914 |
| 4,566,975 | 1/1986 | Allgulin ............................... 210/912 |
| 4,725,357 | 2/1988 | Downing et al. .................... 210/912 |
| 4,806,264 | 2/1989 | Murphy ............................... 210/902 |

Primary Examiner—Peter Hruskoci
Attorney, Agent, or Firm—Thomas M. Freiburger

[57] ABSTRACT

A method and system for removing toxic substances such as selenium and molybdenum from agricultural irrigation water achieves nearly 100% removal of the toxic substance economically, by a chemical reduction process. The process is particulary efficacious for removing naturally occurring selenium and molybdenum from irrigation water which has seeped through the ground and taken compounds of these metals into solution. Preferably, the drain tile water solution is first concentrated, to about 30% dissolved solids. This may be economically accomplished by on site evaporation in an open pond which is impermeable to seepage. Next the concentrated brine solution is heated, preferably to about 150° F., and a reducing agent such as finely powdered iron is added to bring, for example, the selenium down from a +6 valence to +4 and lower valences. Wettable sulfur is added to the slurry to greatly improve the effectiveness of the iron in reducing the solution. The slurry is constantly agitated. After a reaction time which may be about 15 minutes, an oxidizing agent is added, with the temperature of the slurry then raised to at least about 180 °, with continued agitation. This causes the selenium and/or molybdenum to form a separable precipitate, and the precipitate is separated from the remainder of the slurry. In a preferred embodiment the iron is recycled by processing it through a separator.

18 Claims, 1 Drawing Sheet

METHOD FOR REMOVING TOXIC METALS FROM AGRICULTURAL DRAIN WATER

BACKGROUND OF THE INVENTION

The invention relates to removal of toxic substances from water, and is particularly directed to removal of toxic metals from agricultural tile drain water. Typically, such substances are natural minerals which are picked up by the water in leaching through the ground when the water is used for irrigation, and these substances include selenium and molybdenum.

The process of the invention is particularly concerned with removal of selenium from the drain waters produced from irrigation of soil containing natural alluvial deposits of selenium. In some cases there will also be, or there will alternatively be, molybdenum present.

In this specification and the accompanying claims, the term "selenium" or "molybdenum" is intended to refer to all soluble compounds of each of these metals, as well as the elemental metals themselves.

A particularly acute problem of selenium buildup (and also molybdenum) has occurred in the drain waters from irrigation of the San Joaquin Valley in Calif. Subterranean drains are necessary there to prevent the buildup of salts in the perched water layer which, if not drained, would build up to a level whereby the saline layer would reach the plant roots, with the resultant loss of that land for useful agriculture.

The perched water layer in many areas of the San Joaquin Valley percolates through selenium-bearing soils, with the result that the selenium content reaches toxic levels. This is particularly true when the tile drain water is retained in an evaporation pond or reservoir, with consequent concentration of the brine. The seleniferous drain water cannot be disposed of safely or legally without prior removal of the selenium.

San Joaquin Valley tile drain water is typified by the data given in Table I. Selenium concentration and molybdenum content and the total dissolved solids (TDS) are all too high to be recycled for irrigation or to be dumped into a river or ocean bay. Further, if stored in an open reservoir, the tile water will poison birds and fish and other marine life, eventually finding its way into the human food chain.

TABLE I

| FIREBAUGH TILE WATER ANALYSIS (Firebaugh Irrigation District, San Joaquin Valley, Calif.) | |
|---|---|
| pH | 8.0 |
| Carbonate ($CO_3$), mg/L | *1 |
| Bicarbonate ($HCO_3$), mg/L | 150 |
| Chloride (Cl), mg/L | 650 |
| Sulfate ($SO_4$), mg/L | 4000 |
| Calcium (Ca), mg/L | 380 |
| Magnesium (Mg), mg/L | 300 |
| Sodium (Na), mg/L | 1600 |
| Iron (Fe), mg/L | *0.1 |
| Manganese (Mn), mg/L | *0.01 |
| Nitrate ($NO_3$), mg/L | 74 |
| Fluoride (F), mg/L | 0.3 |
| Potassium (K), mg/L | 2 |
| Selenium (Se), mg/L | 0.28 |
| Specific Conductance (EC), micromhos/cm at 25° C. | 8600 |
| Hardness as $CaCO_3$, mg/L | 2200 |
| Hardness as $CaCO_3$, gpg | 130 |
| Total Dissolved Solids (TDS), mg/L | 7200 |

*Less than

Prior selenium removal systems and methods have been concerned primarily with mine waters and similar drain waters. Many efforts have been made, unsuccessfully, to remove selenium from agricultural drain waters. It is known that selenium plus 6 valence can be reduced to selenium plus 4, which occurs as selenite. This can be reduced to elemental selenium at a valence of 0. This can be reduced further to a valence of minus 2 or selenide. A complicating factor in the agricultural drain waters, aside from the selenium content, is the presence of nitrates originating from nitrogenous fertilizers. These nitrates apparently tend to consume reducing agents by themselves being reduced to nitrites.

U.S. Pat. No. 4,405,464, issued to Kerr-McGee Nuclear Corporation, is pertinent to this invention in that it discloses a process for removing selenium from mine waters. However, the disclosed removal process is not applicable to the removal of selenium or molybdenum from agricultural irrigation drain waters, since it does not deal with the contained nitrate in the agricultural drain waters. Further, the Kerr-McGee process involves passage of the liquid solution up through a column of iron particles. This would involve a very large amount of iron, with a limited amount of water passing through it, and the process thus would appear not to be economically feasible for purposes of the present invention.

In the Kerr-McGee patent, zinc granules gave a modest reaction in attempting selenium recovery. Copper, manganese, magnesium and aluminum powders gave very modest selenium reaction.

Mayenkar U.S. Pat. No. 4,565,633 discloses a process for removal of dissolved heavy metals from waste effluents. The process disclosed in the patent is somewhat similar to that of the Kerr-McGee patent. Mayenkar suggested the use of coarse iron filings (optimally 35 to 45 mesh, U.S. Standard Sieve), in a bed into which the aqueous solution was introduced. A long contact time with the iron filings was relied upon in the disclosed process. A pilot plant was actually built in accordance with the teachings of the patent, to treat Firebaugh irrigation effluent, but the project was unsuccessful.

In U.S. Pat. No. 4,026,797, nickel, cobalt and iron gave reasonable recoveries of selenium at 180 psi autoclaving, at pH less than 3. Sodium sulfide and 5 grams per liter iron as ferric sulfate, also with autoclaving, was reported as giving a reasonable selenium conversion.

In U.S. Pat. No. 4,497,654, chromous sulfate reduction was used in metal sulfate solutions to effectively reduce 10 milligrams per liter selenium at 60° C. This would be unworkable, as the resultant chromium input would be almost as deleterious as the original selenium.

In U.S. Pat. No. 4,544,541, sodium borohydride at 5 grams per liter was effective in reducing 18 milligrams per liter of selenium down to about 1 milligram per liter. This could be optimized to be effective, but is much too expensive to be practical.

An important object of the present invention is to efficiently and economically remove selenium, and other toxic heavy metals such as molybdenum, from agricultural tile drain waters such as those found in the San Joaquin Valley of Calif.

SUMMARY OF THE INVENTION

In one embodiment of the method of the present invention, for removing soluble selenium (and/or molybdenum) from a solution of tile drain water, the pH of the solution is first adjusted to a range of 3.0 to 6.0. A reducing agent, such as finely powdered iron, is added to the solution, with agitation of the resulting slurry to keep the reducing agent in suspension. Wettable elemental sulfur is also added to the slurry. The reducing agent (e.g. iron) and the sulfur are added in sufficient quantities to permit recovery of the selenium with the additional steps of the method.

During the time the iron and the sulfur are reacting in the solution, the slurry is agitated substantially continuously.

After a time within which the pH of the solution rises and then stabilizes (and the slurry turns very dark, appearing black), an oxidizing agent is added, in an amount sufficient to effect selenium recovery as a precipitate. The slurry continues to be agitated substantially continuously, until the precipitated selenium is recovered.

In specific embodiments of the invention, the tile drain water is first preferably concentrated down to about 3 to 40 milligrams selenium per liter of solution. The brine may be concentrated to about 25% to 30% total dissolved solids.

A preferred reducing agent comprises iron in fine powder form, preferably at least as fine as 80% -325 mesh (U.S. Standard). The iron is effective when added in an amount of about 200:1 as compared to the selenium content by weight, and in any event more than 100:1 is required (100:1 produced no reaction).

It has been found that optimally, the pH of the solution, prior to addition of the reducing agent and the sulfur, is about pH 4.5 to 5.5.

The temperature of the slurry may be about 150° F. with addition of the reducing agent and the sulfur, and with the temperature subsequently raised to about 180° F. to 200° F. after addition of the oxidizing agent.

The process of the invention is effective to recover molybdenum from these tile drain waters, if present, along with the selenium.

The typical tile drain water which has been processed in accordance with the principles of the invention, from the San Joaquin Valley, was evaporated to about 30% total dissolved solids. This is a near saturated brine. At this point, a considerable amount of calcite and gypsum have dropped out of solution. The selenium content of the concentrated San Joaquin Valley drain tile water was about 18 milligrams per liter. There was also a molybdenum content of about 2.8 milligrams per liter.

Thermal or solar evaporation is preferred for concentrating the tile water, preferably at or near the site of the irrigation. This avoids the high cost of heating the entire volume of undiluted brine to a temperature to facilitate the selenium reduction.

The process of the invention, in one preferred embodiment, utilizes a combination iron and sulfur reduction, followed by a peroxide treatment. It has been found that relatively fine iron is required to provide reaction rates and iron dosages that are technically and economically feasible.

The very large amount of iron required in utilizing the prior art methods, in order to provide high selenium removal, has been found not required when a combination of sulfur and iron are used, with the subsequent peroxide treatment. The sulfur greatly increases the effectiveness of the iron in reducing these tile waters, and this may be due in particular to the nitrate content of the tile waters. The presence of the sulfur may prevent large quantities of the iron from being tied up with reduction of nitrates to nitrites. In any event, tests have shown that, for a concentrated solution with about 18 milligrams per liter selenium, the iron requirement for near-total selenium removal can be reduced from about 26 grams per liter down to about four grams per liter in the presence of sulfur.

It is therefore among the objects of the invention to greatly improve over prior selenium removal processes which have been suggested, and in particular to effectively and efficiently remove selenium and/or molybdenum from drain tile waters from agricultural irrigation, which waters contain nitrates and other substances from fertilization. These and other objects, advantages and features of the invention will be apparent from the following description of a preferred embodiment, considered along with the accompanying drawing.

DESCRIPTION OF THE DRAWING

The drawing FIGURE is a schematic flow chart diagram indicating an overall process according to the invention for removal of toxic metals from agricultural tile drain water.

DESCRIPTION OF PREFERRED EMBODIMENTS

Figure 1:
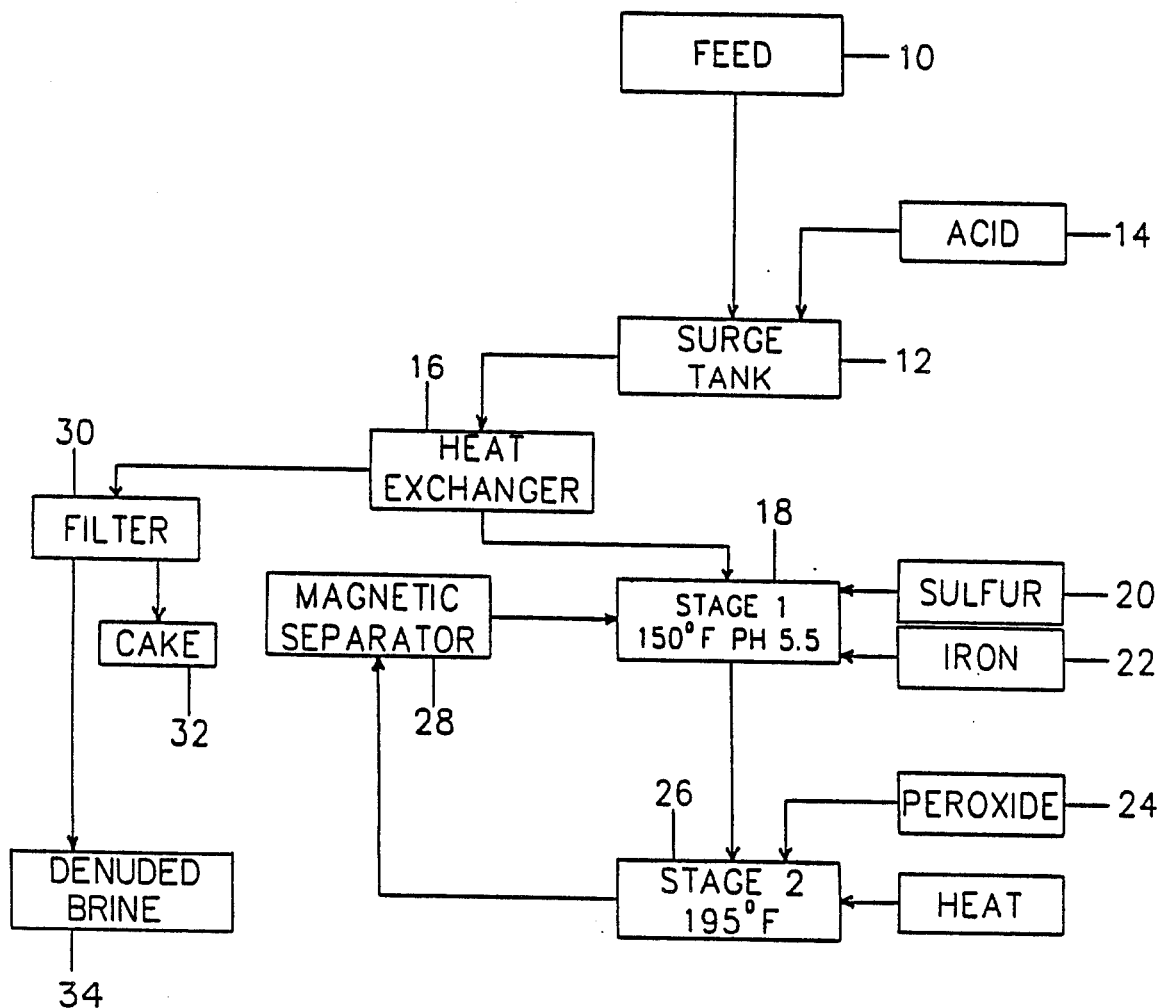

As outlined above, typical San Joaquin Valley drain tile water evaporated to a 30% total dissolved solids (TDS) content is a near total saturated brine, with a selenium content of about 18 mg per liter and a molybdenum content of about 2.8 mg per liter. A selenium content of one milligram per liter is considered a toxic level.

For tests in developing the selenium removal process of the invention, initially a synthetic brine was made up containing 25% TDS for process evaluation. This was made up of sodium chloride, sodium sulfate, magnesium chloride, sodium nitrate, and sodium selenate.

The flow diagram of the drawing indicates principal steps in the selenium/molybdenum removal process. Tile drain water feed solution indicated in the block 10, preferably already concentrated to a TDS content of 25% to 30%, is fed into a surge tank 12, where acid 14 is added to bring the pH of the solution into the desired range—preferably 3.0 to 6.0, and optimally about 4.5 to 5.5. The pH-adjusted solution is then passed through a heat exchanger 16, where it is heated preferably to about 150° F., or at least to some elevated temperature, prior to introduction to a Stage I treatment tank 18 as shown. 150° has been found to be a convenient operating temperature in the Stage I tank, assuming reaction time and reagent quantities as stated below. It is not critical that the temperature be at 150°; generally, reaction time is longer at lower temperatures and vice versa.

For a solution having 25% TDS and a selenium content of about 18 mg/L, 4 grams sulfur and 4 grams iron per liter were added to the Stage I tank, with the slurry maintained at about 150° F. The acidity of the solution at the time of iron and sulfur addition was about pH 5.5.

In the Stage I reaction, it has been found that very large amounts of iron are required to reduce the selenium in solution, if iron alone is relied upon at this stage. This would apparently also be the case if other reducing agents were used alone. For example, in a brine containing 18 milligrams per liter selenium, and using fine iron having a particle size of 80% -325 mesh ("Ancor Grade B iron" as designated by Hoeganaes Company of Riverton, N.J.) or finer, with a total dissolved solids content of 25% to 30%, it was found that 25-26 grams per liter of iron were required. This amount was required to reduce the solution and provide recoverable selenium to the extent achieved by the preferred method, and it was in combination with the later oxidizing step as in the preferred method, as described below.

With the addition of sulfur in quantities as described below, the amount of iron, in similar particle size as just described above, can be reduced from 26 grams per liter down to about 4 grams per liter, assuming the same brine solution is being treated.

The amount of iron required, and the amount of sulfur required as well, depend upon the total content of selenium (and/or molybdenum) in the brine solution. The brine solution need not be concentrated to the degree specified above, and it need not be concentrated at all if desired. In this case a much lower concentration of iron and sulfur is required, since the amounts of iron and sulfur required are tied to the amount of selenium present.

Thus, it has been found that the preferred 80% -325 mesh iron is effective in an amount by weight of about 200:1 as compared to the amount by weight of selenium in solution in the tile drain water. It may be effective in somewhat lower quantity, but it has proven not effective at a ratio of 100:1.

With the sulfur, it has been found that an amount by weight of at least about 100:1 as compared to the amount by weight of selenium is effective. The sulfur may be effective in somewhat lower concentration.

Finer iron may be used, in somewhat smaller quantities to produce the same result, but the results are not improved and finer iron is far more expensive, making the process less economically feasible.

At a temperature of about 150° F., 15 minutes is sufficient reaction time in the Stage I reaction; at lower temperatures, longer times are necessary. The slurry of brine solution, iron and sulfur is agitated substantially constantly in the Stage I tank, to prevent scaling up and falling out of iron from the slurry.

After adequate Stage I reaction time, the slurry has turned very dark in color, appearing black. During the reaction the pH of the slurry rises; e.g., if the initial pH is 5.5, it rises to about 6.0.

After the completion of this Stage I reaction, as evidenced by the black color and the rise in and stabilization of the pH, about 10 ml/liter of 3% hydrogen peroxide is added (for a concentrated brine with about 18 mg/L selenium), indicated at 24 in the drawing FIGURE. This begins the Stage II reaction, indicated in the block 26 in the drawing. Agitation of the slurry continues, and the temperature of the slurry is preferably raised to about 180° to 200° F. (or just under boiling), most preferably about 190° to 195° F. The slurry turns to a rust color within seconds.

After a total retention time of one to two hours (including Stages I and II), the slurry is cooled and filtered. Precoat filter may be required.

As shown in the drawing, the reactor discharge may be denuded of magnetic iron in a magnetic separator 28. This iron can be recycled back to the Stage I reactor, in an attempt to minimize the amount of fresh iron required. Some of this iron may not be reactive, and if the non-reactive iron builds up it eventually may have to be removed and not recycled.

As indicated in the drawing, the hot brine can subsequently be passed through the heat exchanger 16 to heat the brine feed moving between the surge tank 12 and the Stage I reactor.

The treated brine, thus cooled, can then be filtered on a vacuum filter 30 as well as a pressure filter, depending on end requirements. A precoat may be used to minimize contamination of the filtrate by the seleniferous solid. For vacuum filtration, the brine should be at a temperature below 150° F.

The drawing shows the products of filtration as a solid filter cake 32, and denuded brine 34.

The results of selenium removal procedure as described above in reference to the drawing are shown in Table II. In Table II, with Examples 1 through 4, results from both concentrated field brine and synthetic brine are shown.

An unexpected finding was more than 50% molybdenum removal by the iron-sulfur treatment. This result occurred with Example 1 below, a test on actual tile water. No attempt was made to optimize this step.

TABLE II

| | SELENIUM REMOVAL TEST SUMMARIES | | | |
|---|---|---|---|---|
| Brine | EXAMPLE 1 Conc. Tile Water[1] | EXAMPLE 2 Synthetic[2] | EXAMPLE 3 Synthetic | EXAMPLE 4 Synthetic |
| Initial pH | 2.8 | 3.1 | 4.5 | 5.5 |
| Temperature | 140–195 | 150–195 | 140–200 | 140–210 |
| Iron Powder[3] gr/liter | 5 | 5 | 4 | 4 |
| Sulfur gr/liter | 2 | 5 | 4 | 4 |
| $H_2O_2$ 3% mil/liter | 10 | 10 | 10 | 10 |
| Selenium in mg/liter | 19 | 21 | 21 | 21 |
| Selenium Remaining | | | | |
| mg/liter | 6.7 | 3.8 | 9 | 5.3 |
| Total Time (in hours) | 1 | 1 | 1 | 1 |
| Selenium Remaining | | | | |
| mg/liter | 0.028 | 0.007 | <0.01 | — |
| Total Time (in hours) | 2 | 2 | 2 | 2 |

[1]Water from Firebaugh Drain evaporated to 30% TDS.
[2]Synthetic brine containing 25% TDS.
[3]Powder sizing 80% −325 U.S. Mesh.

EXAMPLE 2A

A test was made on synthetic brine solution, similar to Example 2. Brine with 19 mg per liter selenium was adjusted to pH 3.2. Temperature and peroxide addition were as in Example 2. Two grams iron per liter and two grams sulfur per liter (about 100:1 were used. After one hour reaction time, 17 mg/L selenium was still present in the filtrate. This shows essentially no selenium recovery, given the margin of error in testing and analysis.

Conclusions from these tests show the following:

1. Very large amounts of subsieve iron powder (electrolytically reduced), about 25-30 gr/liter, are needed for +90% selenium removal from concentrated field brine, in the absence of sulfur.
2. Examples 1-4 show that the process of the invention works well when the brine is initially in essentially any acid range of pH. 3.0 to 6.0 is preferable.
3. Sulfur quantity can be as low as 100:1 (and possibly lower) as compared to the selenium content by weight, as shown by Example 1.
4. The minimum amount of peroxide has not been determined, and the amount used probably is excessive. It is assumed that only enough to provide an oxy-hydroxy coating on the iron particles would be required, and/or enough to precipitate the ferric salt, carrying the selenite, from solution. Excess, unused peroxide decomposes and passes into the air.
5. Iron and sulfur with no peroxide treatment gave essentially no selenium removal.
6. Two hours total reaction time, with the final temperature in the 180-200° F. range, is a preferred safe reaction time.
7. Both the Stage I and the Stage II effective temperatures comprise broad ranges. The higher Stage II range can be up to just below boiling, with lower temperatures requiring longer reaction times.
8. Agitation sufficient to suspend the iron powder is required to prevent scaling.
9. "Grade B" iron is effective in an amount of about 200:1 as compared to the selenium content by weight. The amount of iron must be greater than 100:1, as shown by Examples 1, 2 and 2A.

Although fine iron is preferred as a reducing agent, other reducing agents than iron may be used in combination with sulfur to reduce selenium effectively. These will include metals and/or reducing agents with sufficient reduction potential to reduce the selenate (Se 6+) to a recoverable form, such as magnesium, aluminum and zinc powders and hydrides, sodium borohydride, and other reductors. Also, oxidizing agents other than peroxide may be used in the oxidation step of this process. These might include known industrial oxidants such as chlorine, etc., or even oxygen or simple air, introduced under pressure.

The time and temperature are, to some degree, interchangeable in this process. Lower temperatures require more reduction time in the final step.

The above examples in Table II tend to show that in Example 2, an initial pH of 3.1 produced a better first-hour selenium recovery than did the initial pH of 4.5 or 5.5 in Example 3 or Example 4. However, total selenium removal after the second hour is about the same in all of Examples 2, 3 and 4, and it is pointed out that 25% more iron powder (and also 25% more sulfur) was used in Example 2 than in Examples 3 and 4.

Also, acid consumption in the selenium removal process of the invention is an economic factor to be considered. The process as conducted in Example 2 required considerably more acid, to bring the pH down to 3.1 (agricultural tile drain water tends to be somewhat alkaline). Thus, Examples 3 and 4 are considered to reflect preferred parameters of the process.

EXAMPLE 4A

The steps of the process as represented in Example 4 could be repeated, with similar results, by introduction of air under pressure for oxidation in Stage II, rather than addition of peroxide. Total reaction time can be expected to be somewhat longer.

In tests of alternate reducing agents (other than iron), the following results were noted (elemental sulfur was not present):

Sulfur dioxide was tried with limited success. The sulfur dioxide reacts with selenite, but not with selenate.

Zinc was also ineffective with selenate.

Stannous chloride was likewise ineffective.

The following tests were conducted regarding quantities of iron required, without and with the presence of sulfur:

EXAMPLES 5A-5C (No Sulfur)

A series of iron powders 27 gr/liter, 155° F. for 15 minutes, then addition of 10 milliliters per liter hydrogen peroxide, followed by increase to 200° F. for one hour:

EXAMPLE 5A: 15% -325 mesh powder gave 50% selenium removal.

EXAMPLE 5B: 80% -325 mesh powder gave 83% selenium removal (Grade B iron).

EXAMPLE 5C: Less-than-20 micron powder gave +90% selenium removal.

No sulfur was used in Examples 5A, 5B and 5C. The following examples, Examples 6 and 7, included the used of sulfur with the iron.

EXAMPLE 6

The first test with iron and sulfur 8.2 grams per liter Grade B iron plus 4 grams per liter sulfur, peroxide added after reaction with iron and sulfur, one hour total reaction time, at a maximum of 190° F. Plus 99% selenium removal.

EXAMPLE 7

In another test, at 158° F., one hour, 4 grams per liter Grade B iron and sulfur, with hydrogen peroxide treatment, there was negligible reaction. This is significant in showing the importance of raising the temperature of the hydrogen peroxide, although the reaction would eventually go to completion at 158° F., over a much longer period of time. The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A method for removing soluble selenium from a solution of agricultural tile drain water, or irrigation effluent, comprising:

adjusting the pH of the solution to a range of about 3.0 to 6.0, adding a reducing agent to the solution, with agitation, and forming a slurry with the solution and reducing agent, adding wettable elemental sulfur to the solution, the amounts of the reducing agent and of the sulfur being selected in combination to permit recovery of the selenium with additional steps of:

continuing to agitate the slurry, after a period of time within which the pH of the slurry rises and then stabilizes, oxidizing the slurry sufficiently to effect selenium recovery as a precipitate, and continuing to agitate the slurry substantially continuously, and separating the recovered, precipitated selenium.

2. The method of claim 1, wherein the tile drain water is first concentrated down to about 3 to 40 mg selenium per liter.

3. The method of claim 2, wherein the reducing agent consists essentially of iron in fine powder form, added in an amount of more than 100:1 as compared to the selenium content by weight.

4. The method of claim 3, wherein the iron is added in an amount of about 200:1 as compared to the selenium content by weight.

5. The method of claim 3, wherein the iron has a grain size at least as small as about 80% -325 mesh.

6. The method of claim 1, wherein the oxidizing step comprises adding hydrogen peroxide solution to the slurry.

7. The method of claim 1, wherein the pH of the solution in the adjusting step is adjusted to about pH 5.5.

8. The method of claim 1, wherein the reducing agent consists essentially of fine, dispersible powdered iron.

9. The method of claim 8, further including, following reaction by the oxidizing agent, using a magnetic separator to remove uncombined iron particles from the slurry.

10. The method of claim 1, wherein the temperature of the slurry is established at about 150° F. with addition of the reducing agent and the sulfur.

11. The method of claim 10, wherein the temperature of the slurry is raised to about 190° F. after addition of the oxidizing agent.

12. The method of claim 1, wherein the reducing agent consists essentially of dispersible iron in fine powder, and wherein the amount by weight of iron is more than 100:1 and the amount by weight of sulfur as at least about 100:1 as compared to the amount by weight of selenium in solution in the tile drain water just preceding the addition of the iron and sulfur.

13. A method for removing soluble selenium from agricultural tile drain water, comprising, adjusting the pH of the solution to an acid range, adding a reducing agent to the solution, and producing a slurry with the solution and the reducing agent, with agitation of the slurry to keep solids in suspension, using wettable sulfur to increase the effectiveness of the reducing agent in reducing the selenium in solution, by adding it to the solution along with the reducing agent, keeping the slurry of the solution and the reducing agent and sulfur agitated to prevent scaling up and falling out of reducing agent from the slurry, while maintaining the slurry at a sufficient temperature for selenium recovery, adding an oxidizing agent in an amount sufficient to react with said slurry and effect selenium recovery as a precipitate, while continuing to agitate the slurry, and after sufficient reaction time at said temperature to effect selenium recovery, separating the recovered, precipitated selenium.

14. The method of claim 13, wherein the reducing agent is iron powder having a grain size at least as fine as 80% -325 mesh (U.S. Standard).

15. The method of claim 14, wherein the amount by weight of iron is more than 100:1 and the amount by weight of sulfur is at least about 100:1, as compared to the amount by weight of selenium in solution in the tile drain water just preceding the addition of the iron and sulfur.

16. The method of claim 15, wherein the amount by weight of iron is about 200:1 as compared to the amount by weight of selenium in solution in the tile drain water.

17. The method of claim 13, wherein the slurry is maintained at about 150° F. after addition of the reducing agent and sulfur and until the pH stabilizes, and is raised to at least about 180° F. and maintained at that temperature while the oxidizing agent reacts in the slurry.

18. A method for removing soluble selenium and/or molybdenum from a solution of agricultural tile drain water, comprising, adjusting the pH of the solution to a range of about 3.0 to 6.0, adding a reducing agent to the solution, with agitation, and forming a slurry with the solution and reducing agent, adding wettable elemental sulfur to the solution, the amounts of the reducing agent and of the sulfur being selected in combination to permit recovery of the selenium and/or molybdenum with additional steps of:

continuing to agitate the slurry, after a period of time within which the pH of the slurry rises and then stabilizes, adding an oxidizing agent in an amount sufficient to effect recovery of a product including selenium and/or molybdenum as a precipitate, and continuing to agitate the slurry substantially continuously, and separating the recovered, precipitated product.

* * * * *

UNITED STATES PATENT AND TRADEMARK OFFICE
CERTIFICATE OF CORRECTION

PATENT NO. : 4,940,549

DATED : July 10, 1990

INVENTOR(S) : Olsen et al

It is certified that error appears in the above-identified patent and that said Letters Patent is hereby corrected as shown below:

The title page should be deleted to appear as per attached title page.

Figure 1, should be deleted to appear as per attached page.

Signed and Sealed this

Third Day of March, 1992

Attest:

Attesting Officer

HARRY F. MANBECK, JR.

Commissioner of Patents and Trademarks

United States Patent [19]

Olsen et al.

[11] Patent Number: 4,940,549
[45] Date of Patent: Jul. 10, 1990

[54] METHOD FOR REMOVING TOXIC METALS FROM AGRICULTURAL DRAIN WATER

[75] Inventors: Orrie C. Olsen; Peter F. Santina, both of Walnut Creek, Calif.

[73] Assignee: Santina Water Company, Concord, Calif.

[21] Appl. No.: 304,497

[22] Filed: Jan. 31, 1989

[51] Int. Cl.$^5$ .............................. C02F 1/48; C02F 1/70
[52] U.S. Cl. ..................................... 210/695; 210/719; 210/721; 210/724; 210/726; 210/737; 210/912; 423/55; 423/508
[58] Field of Search ............... 210/695, 716, 717, 719, 210/721, 722, 724, 737, 902, 912, 726; 423/55, 58, 508, 509

[56] References Cited

U.S. PATENT DOCUMENTS

| | | | |
|---|---|---|---|
| 3,933,635 | 1/1976 | Marchant | 210/719 |
| 4,026,797 | 5/1977 | Nikolic et al. | 210/719 |
| 4,405,464 | 9/1983 | Baldwin et al. | 210/719 |
| 4,422,943 | 12/1983 | Fender et al. | 210/914 |
| 4,566,975 | 1/1986 | Allgulin | 210/912 |
| 4,725,357 | 2/1988 | Downing et al. | 210/912 |
| 4,806,264 | 2/1989 | Murphy | 210/902 |

Primary Examiner—Peter Hruskoci
Attorney, Agent, or Firm—Thomas M. Freiburger

[57] ABSTRACT

A method and system for removing toxic substances such as selenium and molybdenum from agricultural irrigation water achieves nearly 100% removal of the toxic substance economically, by a chemical reduction process. The process is particulary efficacious for removing naturally occurring selenium and molybdenum from irrigation water which has seeped through the ground and taken compounds of these metals into solution. Preferably, the drain tile water solution is first concentrated, to about 30% dissolved solids. This may be economically accomplished by on site evaporation in an open pond which is impermeable to seepage. Next the concentrated brine solution is heated, preferably to about 150° F., and a reducing agent such as finely powdered iron is added to bring, for example, the selenium down from a +6 valence to +4 and lower valences. Wettable sulfur is added to the slurry to greatly improve the effectiveness of the iron in reducing the solution. The slurry is constantly agitated. After a reaction time which may be about 15 minutes, an oxidizing agent is added, with the temperature of the slurry then raised to at least about 180°, with continued agitation. This causes the selenium and/or molybdenum to form a separable precipitate, and the precipitate is separated from the remainder of the slurry. In a preferred embodiment the iron is recycled by processing it through a separator.

18 Claims, 1 Drawing Sheet

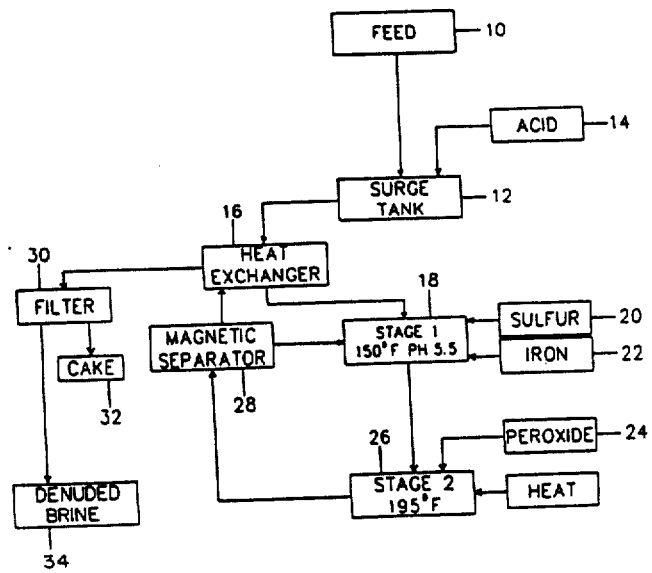

UNITED STATES PATENT AND TRADEMARK OFFICE
CERTIFICATE OF CORRECTION

PATENT NO. : 4,940,549

DATED : July 10, 1990

INVENTOR(S) : Olsen et al

It is certified that error appears in the above—identified patent and that said Letters Patent is hereby corrected as shown below:

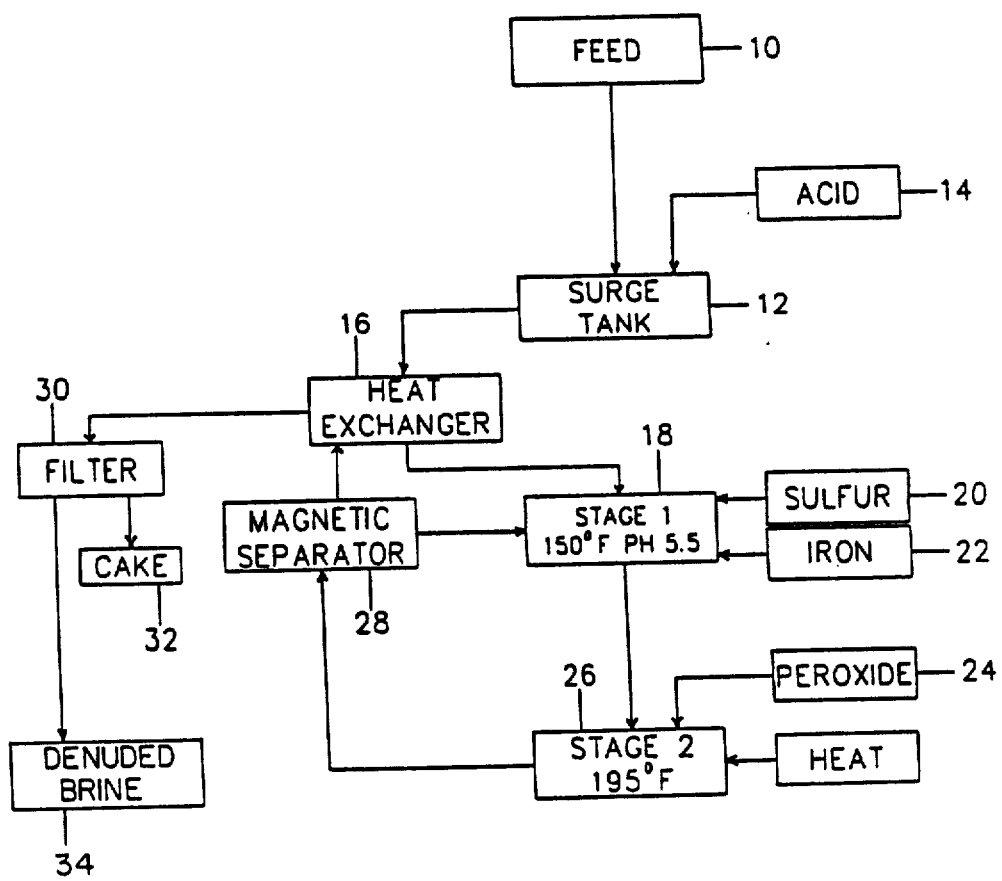

FIGURE 1